United States Patent
Kim et al.

(10) Patent No.: US 11,071,028 B1
(45) Date of Patent: *Jul. 20, 2021

(54) DYNAMIC HANDOVER THRESHOLD ADJUSTMENT FOR LOAD BALANCING

(71) Applicant: Sprint Spectrum LP, Overland Park, KS (US)

(72) Inventors: Yun Sung Kim, Ashburn, VA (US); Pinal Tailor, Ashburn, VA (US); Sanghoon Sung, Ashburn, VA (US); Tri Duong, Annandale, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,275

(22) Filed: Aug. 8, 2019

Related U.S. Application Data

(63) Continuation of application No. 15/241,582, filed on Aug. 19, 2016, now Pat. No. 10,433,220.

(51) Int. Cl.
*H04W 36/00* (2009.01)
*H04W 36/22* (2009.01)
*H04W 28/08* (2009.01)

(52) U.S. Cl.
CPC ...... *H04W 36/00837* (2018.08); *H04W 28/08* (2013.01); *H04W 36/22* (2013.01)

(58) Field of Classification Search
CPC ........... H04W 36/00837; H04W 28/08; H04W 36/22; H04W 24/10; H04W 36/165; H04W 36/0005; H04W 48/20; H04W 36/18; H04W 36/0083; H04W 24/02;

(Continued)

(56) References Cited

U.S. PATENT DOCUMENTS 9,173,140 B2 * 10/2015 Agrawal ......... H04W 36/00837
10,433,220 B2 * 10/2019 Kim ................ H04W 36/00837
2009/0219893 A1    9/2009 Korpela et al.
(Continued)

FOREIGN PATENT DOCUMENTS

CN    104581829 B  *  8/2018
EP      2903337 A1 *  8/2015  ........ H04W 36/0083

OTHER PUBLICATIONS

Marwat et al., "Congestion-Aware Handover in LTE Systems for Load Balancing in Transport Network", Oct. 1, 2014, ETRI Journal vol. 36, Issue 5 (Year: 2014).*

(Continued)

*Primary Examiner* — Ricky Q Ngo
*Assistant Examiner* — Michael K Phillips

(57) ABSTRACT

Access nodes in a network are configured to periodically measure cell loads and exchange cell load measurements with neighbors. At each access node, cell loads are compared with load thresholds, and with neighboring loads, to determine whether or not load balancing operations should be triggered. Load balancing operations include reducing or increasing an effective coverage area of one or both of the congested cell and the neighbor cell by adjusting a handover threshold parameter, such as a threshold signal level. Adjusting thresholds at a congested cell triggers more handovers from the congested cell to the non-congested cell. Similarly, adjusting thresholds at a non-congested cell prevents handovers from the non-congested cell to the congested cell.

11 Claims, 9 Drawing Sheets

(58) Field of Classification Search
CPC . H04W 28/0289; H04W 36/14; H04W 36/08; H04W 36/0085; H04L 43/16
See application file for complete search history.

(56) References Cited

U.S. PATENT DOCUMENTS

| | | |
|---|---|---|
| 2010/0075682 A1 | 3/2010 | del Rio-Romero et al. |
| 2012/0252464 A1* | 10/2012 | Borst .................... H04W 36/22 455/443 |
| 2013/0045740 A1 | 2/2013 | Gayde et al. |
| 2013/0084864 A1 | 4/2013 | Agrawal et al. |
| 2013/0344874 A1* | 12/2013 | Kim .................. H04W 28/0289 455/438 |
| 2014/0302853 A1* | 10/2014 | Militano ......... H04W 36/00837 455/436 |
| 2015/0031360 A1 | 1/2015 | Choi et al. |
| 2015/0092751 A1* | 4/2015 | Vargas Bautista .... H04W 36/22 370/331 |
| 2015/0093996 A1 | 4/2015 | Ghaboosi et al. |
| 2015/0119040 A1 | 4/2015 | Amirijoo et al. |
| 2015/0141014 A1 | 5/2015 | Huang et al. |
| 2016/0073312 A1 | 3/2016 | Sridhar |
| 2016/0150441 A1 | 5/2016 | Gunnarsson et al. |
| 2016/0219478 A1* | 7/2016 | Huang-Fu ............. H04W 36/00 |
| 2017/0208526 A1* | 7/2017 | Madan ............. H04W 36/0094 |
| 2017/0311217 A1 | 10/2017 | Jung et al. |

OTHER PUBLICATIONS

Tang et al., "A Mobile Load Balancing Method In LTE System Based on the Level Analysis", Apr. 29, 2015, CN, CN 104581829, English machine language translation. (Year: 2015).*

NSN White Paper, "TDD and FDD Co-Existence in LTE: Synergies and Enhancements," Nokia Solutions and Networks, Karaportii 3, ESPOO, Finland, pp. 1-8, Dec. 2013.

* cited by examiner

DYNAMIC HANDOVER THRESHOLD ADJUSTMENT FOR LOAD BALANCING

This patent application is a continuation of U.S. patent application Ser. No. 15/241,582, filed on Aug. 19, 2016, which is incorporated by reference in its entirety for all purposes.

TECHNICAL BACKGROUND

In wireless networks that deploy multiple frequency bands within a single geographic area, such as co-located cells or access nodes, inter-frequency handovers are used to offload end-user wireless devices from a congested frequency band to a non-congested frequency band. Typically, inter-frequency handovers are triggered based on radiofrequency (RF) strength of signals transmitted from one or more access nodes. For example, in a long-term evolution (LTE) system, signal level parameters including thresholds are transmitted to end-user wireless devices in system information block (SIB) messages, and measurement events such as A2, A3 and A5 events can trigger a handover request from an end-user wireless devices based on whether or not a signal level of an access node exceeds or falls below a threshold. Some handovers may be forced in order to perform load balancing operations. However, such forced handovers can result in an end-user wireless device requesting multiple handovers back and forth among access nodes or frequency bands, as some combinations of signal level measurements may trigger repeated handovers that are contrary to the intended purpose of the load balancing operations.

OVERVIEW

Exemplary embodiments described herein include systems, methods, and processing nodes for dynamic handover threshold adjustment for load balancing. In an exemplary embodiment, the subject disclosure includes a method for load balancing, including obtaining a first cell load of a first frequency band and a second cell load of a second frequency band, determining a load imbalance between the first cell load and the second cell load based on one or both of: the first cell load exceeding a threshold load, or a difference between the first cell load and the second cell load exceeding a threshold difference, and adjusting a handover threshold parameter. Adjusting the handover threshold parameter correspondingly adjusts an effective cell radius of one or both of the first frequency band or the second frequency band.

In another exemplary embodiment, the subject disclosure includes a system for load balancing, including a processing node and a processor coupled to the processing node. The processor configures the processing node to execute operations including measuring a first cell load of a first frequency band. Upon determining that the first cell load exceeds a load threshold, the processing node determines that a difference between the first cell load and a second cell load of a second frequency band exceeds a difference threshold, adjusts a handover threshold parameter comprising a signal strength of the first frequency band, and transmits the adjusted handover threshold parameter to a wireless device using the first frequency band. The adjusted handover threshold parameter causes the wireless device to request a handover to the second frequency band.

In another exemplary embodiment, the subject disclosure includes a processing node for load balancing. The processing node includes a processor for enabling the processing node to perform operations comprising determining a load imbalance between cell loads of each of a first frequency band deployed by a first access node and a second frequency band deployed by a second access node, adjusting a plurality of handover threshold parameters, wherein the plurality of handover threshold parameters are used by one or more end-user wireless devices to trigger handovers between the first access node and the second access node, and upon determining that the load imbalance does not exist, returning the plurality of handover threshold parameters back to default values. The adjusting and the returning are performed on a periodic basis.

DETAILED DESCRIPTION

In embodiments disclosed herein, one or more access nodes in a network are configured to periodically measure a cell load of one or more frequency bands deployed therefrom, and to exchange their cell load measurement with neighboring access nodes. Cell loads are compared with load thresholds, and with each other, to determine whether or not load balancing operations should be triggered. A particular cell or frequency band is determined to be overloaded or congested when it exceeds a load threshold. Further, a load imbalance is determined when a difference between a cell load of a congested cell and a cell load of a neighboring or co-located cell exceeds a difference threshold. Load balancing operations are triggered upon both the load threshold and the difference threshold being exceeded.

The load balancing operations include reducing or increasing an effective coverage area of one or both of the congested cell and the neighbor cell. The effective coverage area is adjusted by adjusting a handover threshold parameter, such as a threshold signal level, that is transmitted to an end-user wireless device to trigger a handover. Consequently, the non-congested cell may be referred to as a target cell, i.e. a target for a handover of an end-user wireless device from the congested cell. If a serving cell is congested, then an effective handover coverage area of the serving cell is reduced, and an effective handover coverage area of the target cell is increased, thereby triggering more handovers from the congested serving cell to the non-congested target cell. Similarly, if a neighbor cell is congested, then an effective handover coverage area of the neighbor cell is reduced, and an effective handover coverage area of another target cell, for instance, the serving cell, is increased, thereby triggering more handovers from the congested neighbor cell to the non-congested serving cell.

The adjustments to handover threshold parameters are performed incrementally, and repeated subsequent to expiration of predefined time periods, thereby providing time to realize any effects of the adjusted threshold parameters prior to making additional adjustments. Adjusting operations are paused upon determining that the load is balanced. Moreover, as the load is reduced, handover parameters are incrementally adjusted back towards a default value. These and additional operations are further described with respect to the embodiments depicted in FIGS. 1-9 below.

Figure 1A:
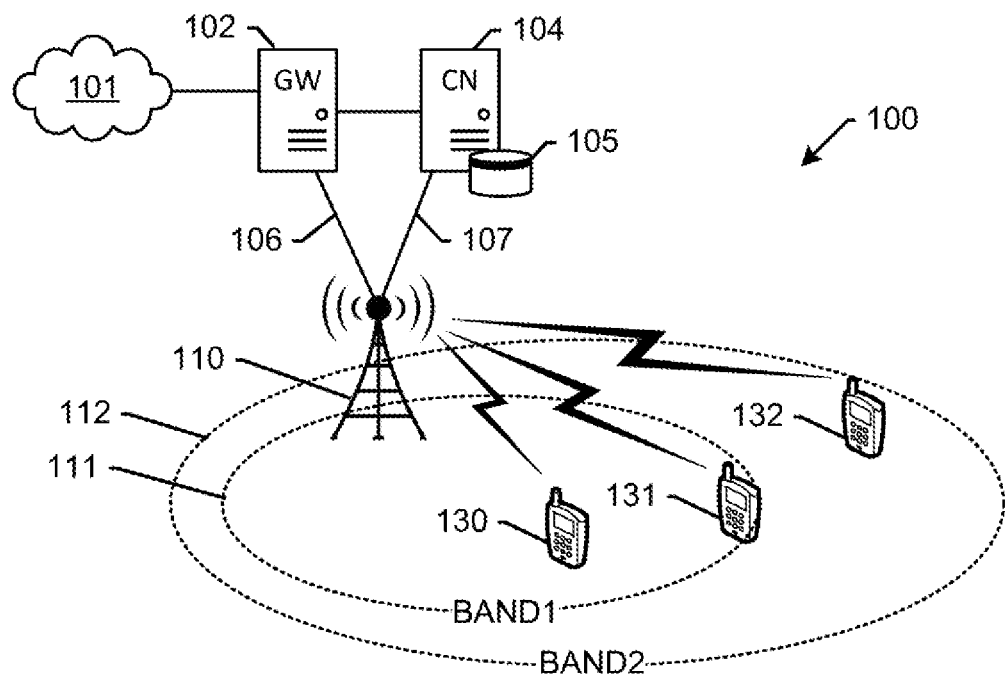
FIGS. 1A and 1B depict exemplary systems for load balancing.
Figure 1B:
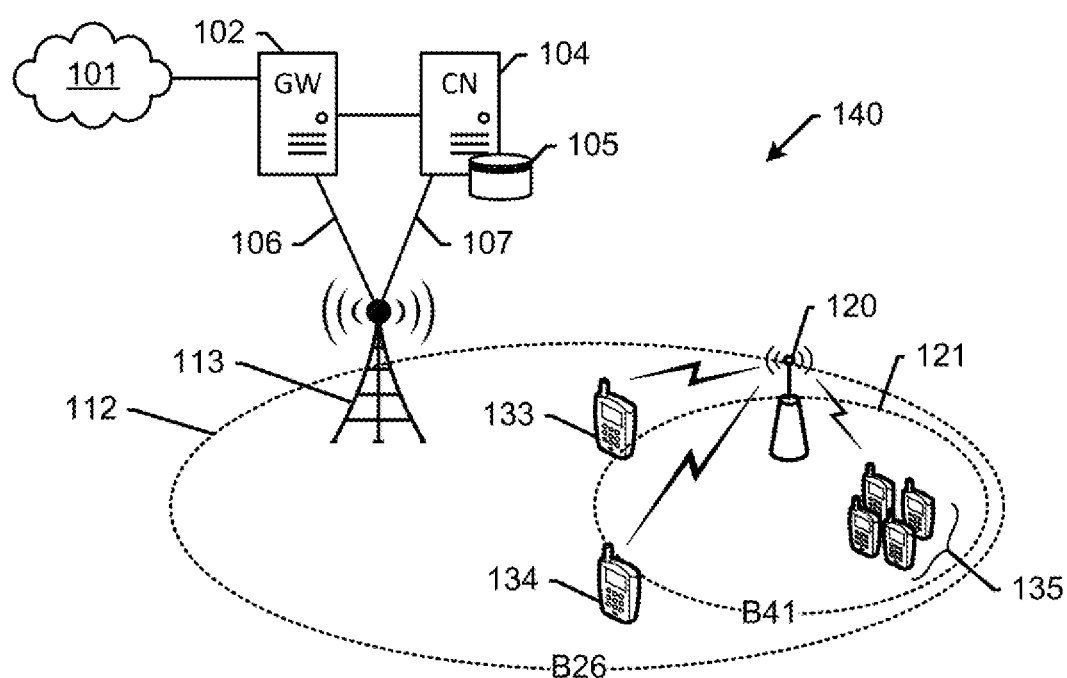

FIGS. 1A and 1B depict exemplary systems 100 and 140 for load balancing. Both systems 100 and 140 comprise a communication network 101, a gateway 102, and a controller node 104. Further, in an embodiment, systems 100, 140 comprise long-term-evolution (LTE) systems deploying frequency bands in three different band classes: band class B25 using frequency division duplexing (FDD) and comprising frequencies around 1.9 GHz, band class B26 using FDD and comprising frequencies around 850 Mhz, and band class B41 using time-division duplexing (TDD) and comprising frequencies around 2.5 Ghz. However, the operations described herein may be applicable to other systems deploying band classes in other frequency bands and using a TDD or FDD communication protocol.

Referring now to FIG. 1A, system 100 further comprises an access node 110 in communication with end-user wireless devices 130, 131, and 132. Access node 110 may deploy two band classes, each having a respective coverage area. For instance, access node 110 may deploy a high frequency TDD band class such as BAND1 having a coverage area of 111, and a low frequency FDD band class BAND2 having a coverage area 112. The larger coverage area 112 is caused by the propagation characteristics of the lower frequency signal. In an embodiment, access node 110 may comprise two co-located cells, or antenna/transceiver combinations that are mounted on the same structure. Consequently, end-user wireless device 130 located within coverage area 111 can access network services from access node 110 using the high frequency band BAND1, and end-user wireless device 132 located well outside coverage area 111 but within coverage area 112 can access network services from access node 110 using the low frequency band BAND2. Further, end-user wireless device 131 is nearby a "border" or edge of coverage area 111.

Thus, upon access node 110 determining a load imbalance between the two frequency bands deployed therefrom, access node 110 can perform load balancing operations that encourage end-user wireless device 131 to request a handover from a congested frequency band to a non-congested frequency band. For instance, in order to trigger offloading of end-user device 131 from band class BAND1 to BAND2, access node 110 can transmit updated handovers thresholds to end-user wireless device 131 to increase a threshold minimum signal level associated with band class BAND1, and to decrease a threshold maximum signal level associated with band class BAND2. Thus, when wireless device 131 monitors measurements of signals in both coverage areas 111 and 112, it is more likely to determine, due to the adjusted handover thresholds, that a signal in band class BAND1 is below the increased threshold minimum and, therefore, requests a handover to band class BAND2, which is within the reduced threshold maximum. Moreover, for wireless devices such as device 132 already attached to band class BAND2, handover requests to band BAND1 are discouraged by transmitting a separate set of thresholds, which lower a threshold minimum for coverage area 112 and raise a threshold maximum for coverage area 111, thereby reducing the likelihood of handover requests to band BAND1, despite measuring strong signal levels from band BAND1. Detailed information about the different threshold adjustments is provided in FIGS. 6-8.

Referring now to FIG. 1B, system 140 further comprises an access node 113, and a small access node 120 that acts as a relay node in communication with end-user wireless devices 133, 134, and 135. In this example, access node 113 deploys a single low frequency band BAND2 having a coverage area 112, and small access node 120 deploys a single high frequency band BAND1, having a coverage area 121. In an embodiment, access node 113 and small access node 120 may also comprise two co-located cells, with small access node 120 being in direct wired or wireless communication with access node 113, and being configured to relay network services and data between access node 113 and one or more of end-user wireless devices 133, 134, 135. Further, end-user wireless devices 133, 134 are nearby an edge of coverage area 121.

Thus, upon small access node 120 determining a load imbalance caused by, for instance, congestion due to end-user wireless devices 135 requesting services therefrom, small access node 120 can perform load balancing operations that encourage end-user wireless devices 133, 134 to request a handover from the congested frequency band of small access node 120 to a non-congested frequency band of access node 113. For example, in order to trigger offloading of end-user devices 133, 134 from band class BAND1 to BAND2, small access node 120 can transmit updated handovers thresholds to end-user wireless devices 133, 134 to increase a threshold minimum signal level associated with band class BAND1, and to decrease a threshold maximum signal level associated with band class BAND2. Thus, when wireless devices 133, 134 monitor measurements of signals in both coverage areas 121 and 112, they is more likely to determine, due to the adjusted handover thresholds, that a signal in band class BAND1 is below the increased threshold minimum and, therefore, request a handover to band class BAND2, which is within the reduced threshold maximum. Pushing these devices to other frequency bands or band classes can therefore help alleviate congestion in a specific band class. Moreover, access node 113 also performs operations to prevent devices attached thereto from requesting handovers to band class BAND1. These operations generally include decreasing a threshold minimum signal level associated with its own signal, i.e. band class BAND2, and increasing a threshold maximum signal level associated with band class BAND1 and transmitting adjusted handover thresholds to devices connected thereto. See, for instance, FIGS. 5 and 9.

Access node 110, 113, and 120 can be any network node configured to provide communication between end-user wireless devices 130-135 and communication network 101, including standard access nodes and/or short range, low power, small access nodes. For instance, access nodes 110 and 113 may include any standard access node, such as a macrocell access node, base transceiver station, a radio base station, an eNodeB device, an enhanced eNodeB device, or the like. In an exemplary embodiment, a macrocell access node can have a coverage area 111, 112 in the range of approximately five kilometers to thirty five kilometers and an output power in the tens of watts. Small access node 120 can be any small access node including a microcell access node, a picocell access node, a femtocell access node, or the like such as a home NodeB or a home eNodeB device.

Moreover, it is noted that while access nodes 110, 113, 120 are illustrated in FIGS. 1A-1B, any number of access nodes, small or macro, can be implemented within systems 100, 140.

Access nodes 110, 113, and 120 can comprise a processor and associated circuitry to execute or direct the execution of computer-readable instructions to obtain information as further described with reference to FIGS. 2 and 3. Briefly, access nodes 110, 113, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 113, 120 can receive instructions and other input at a user interface. Access nodes 110, 113 communicate with gateway node 102 and controller node 104 via communication links 106, 107. Access node 110, 113, 120 may communicate with each other and with other access nodes using a direct link such as an X2 link or similar. For example, each access node 110, 113, 120 transmits load measurements to neighboring access nodes, and receives measurements therefrom.

Wireless devices 130-135 may be any device, system, combination of devices, or other such communication platform capable of communicating wirelessly with access nodes 110, 113, 120 using one or more frequency bands deployed therefrom. Wireless devices 130-135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 113, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130-135, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include 51 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over systems 100, 140. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over systems 100, 140. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics, such as public land mobile network (PLMN) identifiers of access nodes 110, 113, 120, as well as information about end-user wireless devices 130-135. This information may be requested by or shared with access nodes 110, 113, 120 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in systems 100, 140 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 113 and communication network 101

Figure 2:
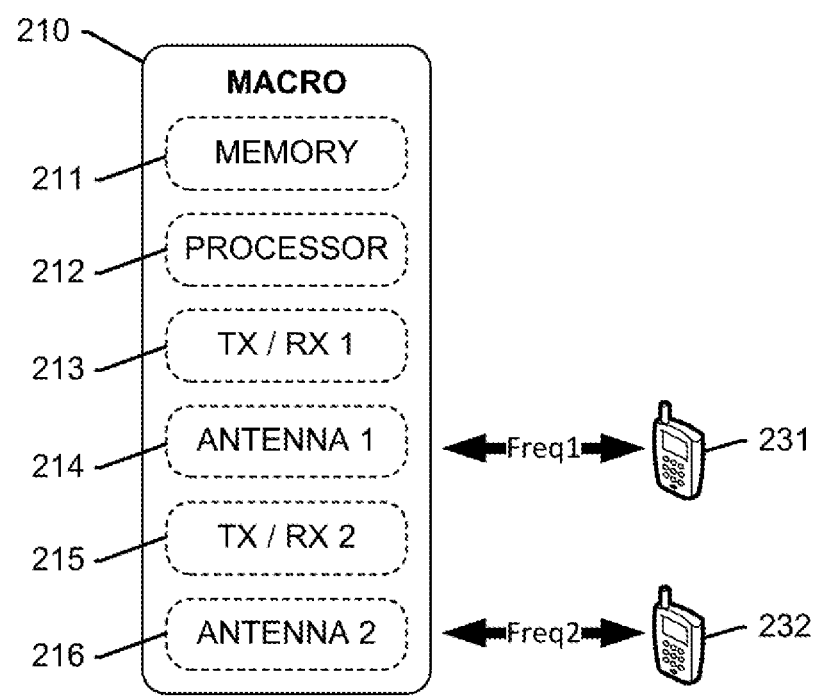
FIG. 2 depicts an exemplary access node for performing load balancing operations.

FIG. 2 depicts an exemplary access node 210 for performing load balancing operations. Access node 210 may be a macro-cell access node as described above, and provides network services to end-user wireless devices 231, 232. Access node 210 is illustrated as comprising a memory 211 for storing logical modules including load balancing operations described herein, a processor 212 for executing the logical modules, a first transceiver 213 and antenna 214 for communication with end-user wireless device 231 over a first frequency, and a second transceiver 215 and antenna 216 for communication with end-user wireless device 232 over a second frequency. Thus, access node 210 can deploy two co-located cells, and balance loads between the two cells by adjusting handover thresholds to trigger handovers between the two cells. Moreover, although only one transceiver and antenna combination is depicted in access node 210, additional transceivers and antennas may be incorporated in order to deploy multiple frequency bands and to facilitate communication across other network nodes that are not shown, such as gateways, controllers, and other access nodes.

Figure 3:
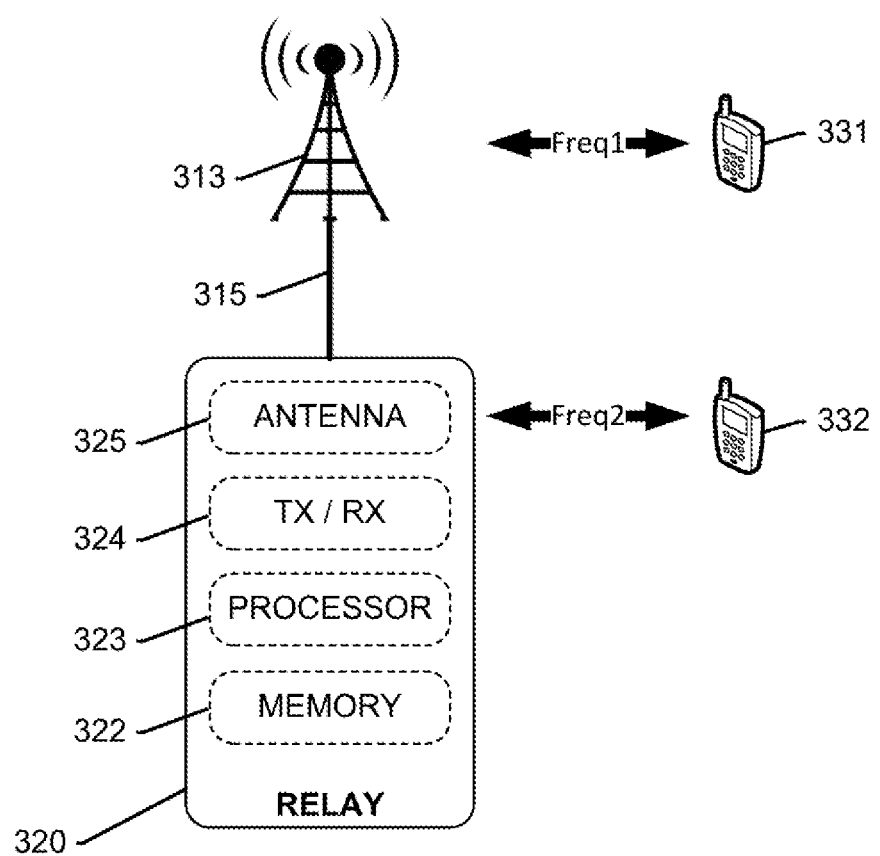
FIG. 3 depicts an exemplary small access node for performing load balancing operations.

FIG. 3 depicts an exemplary small access node 320 for performing load balancing operations. For instance, small access node 320 may be a relay node as described above with respect to system 140, relaying network services between end-user wireless device 332 and access node 313, which is thus referred to as a donor access node. In this embodiment, donor access node 313 communicates with end-user wireless device 331 directly over a first frequency band, and is connected to small access node 325 via a direct connection, such as an X2 or other type of connection. Small access node 320 is illustrated as comprising a memory 322 for storing logical modules including load balancing operations described herein, a processor 323 for executing the logical modules, a transceiver 324, and antenna 325 for communication with end-user wireless device 332 over a second frequency band. In operation, small access node 320 detects a load imbalance based on, for instance, a congested second frequency band, and can balance loads by adjusting handover thresholds to trigger a handover of end-user wireless device 332 to the first frequency band deployed by donor access node 313. Similarly, access node 313 can perform load balancing operations, with the load measurements of both access nodes 313 and 320 being shared with each other via direct connection 315.

Figure 4:
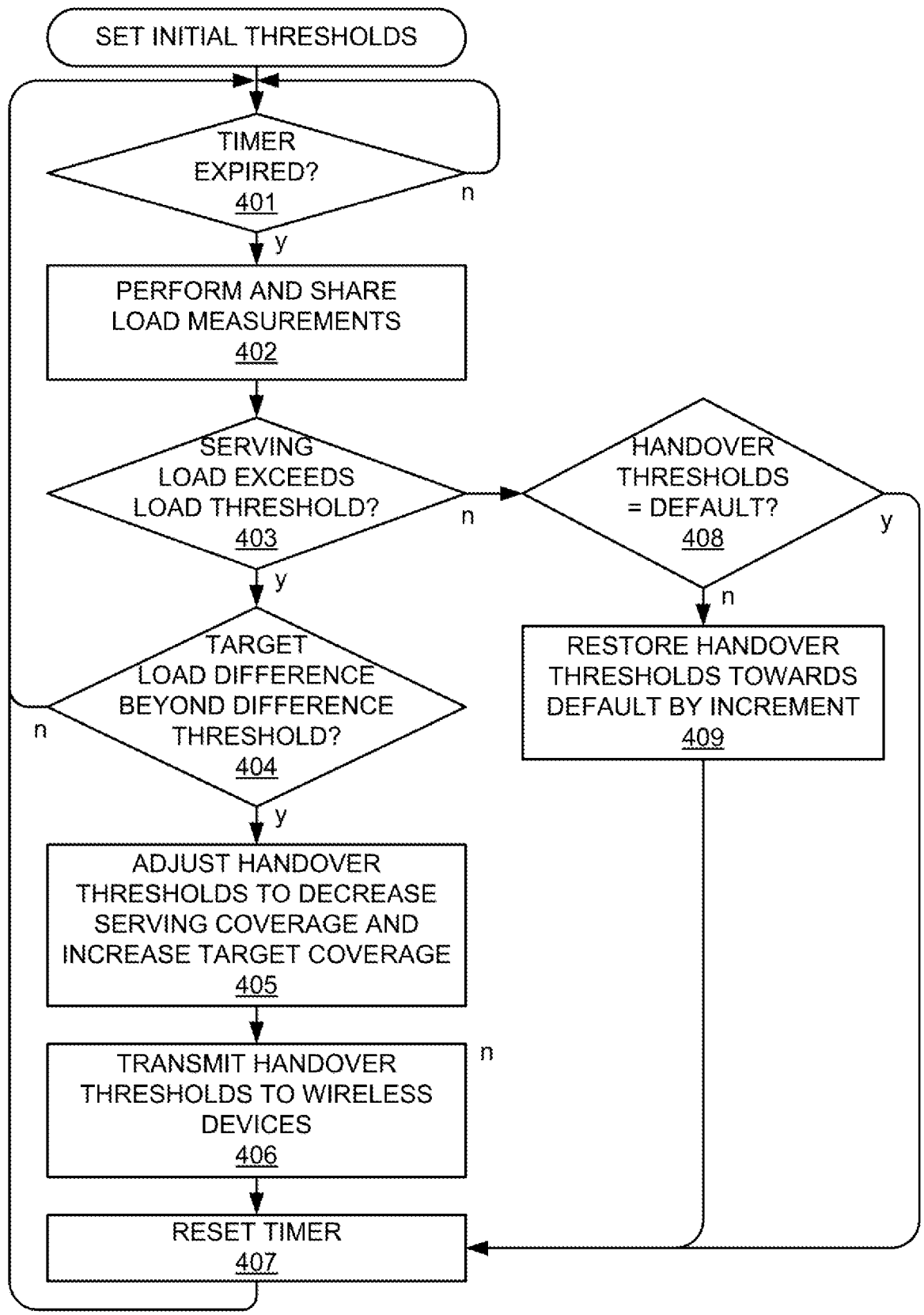
FIG. 4 depicts an exemplary method for load balancing.

FIG. 4 depicts an exemplary method for load balancing. The method of FIG. 4 is illustrated with respect to any network node such as an access node, whether serving or a target access node, or any suitable network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Prior to beginning the method, a plurality of thresholds are predefined. The thresholds may include load thresholds, difference thresholds, handover thresholds, and time thresholds. For instance, a load threshold may be defined, such that any cell load measurement that exceeds the load measurement can trigger additional operations, as shown in 403. A difference threshold may be defined, such that any difference in cell load of two cells can be compared to the difference threshold, as shown in 404. Handover thresholds are defined as initial or default values, which are subsequently modified in 405 and 409. A time threshold, otherwise known as a timer, is defined such that expiration of a timer triggers measurement operations, as in 401 and 402. The timer is reset at 407, allowing for the time period to pass until the next measurement is performed in 402.

Thus, upon a first expiration of the timer in 401, one or more access nodes in a network perform measurements of a cell load for each frequency band deployed therefrom. The cell load may be based on numerous metrics, such as a percentage of available throughput, a power usage, a number of end-user wireless device connected thereto, etc. Moreover, the load measurements are shared with neighbor access nodes via, for instance, an X2 or other direct connection between the access nodes. Therefore, in some embodiments, access nodes within a network are provided with cell load information from each neighbor. This step facilitates determinations of load imbalance 404. However, prior to determining a load imbalance, each access node determines whether or not they are overloaded in 403, using a comparison with a load threshold. A positive determination of overload or congestion triggers the subsequent load imbalance determination 404. A negative determination of overload or congestion triggers adjustment mechanisms 408-409 to incrementally return handover thresholds to a default or initial state, if needed. At 404, a difference between a cell load of a congested cell and a cell load of a neighboring or co-located cell is compared with a difference threshold. The difference threshold may be a percentage threshold, i.e. the cell load of the congested cell may be greater than the cell load of the non-congested cell by a threshold percentage, such as 10%.

[0035] Upon both the load threshold and the difference threshold being exceeded, at 405, an effective serving area of a congested serving band is reduced by increasing a first threshold associated with a congested band falling below a minimum signal level, and reducing a second threshold associated with the non-congested band rising above a maximum signal level, as further described with reference to FIG. 5. At 406, the updated handover thresholds are transmitted to an end-user wireless device to trigger a handover upon measuring signal levels using the updated thresholds and, at 407, a timer is restarted, such that sufficient time is provided for any handovers to take place, prior to restarting the method with steps 401-402.

Load balancing operations further include returning the handover parameters back to a default or initial value upon a determination, in 403, that any congestion is resolved. For instance, after one or more loops through steps 407 and 401, the load is balanced, and congestion is minimized. Consequently, at 408 and 409, any the handover thresholds that are adjusted beyond a default are returned back to their default setting. Notably, both the returning of handover threshold 409 and the adjustments 405 are performed in increments with each loop of the timer. For instance, if handover threshold signal levels are measured in dB, then the incremental adjustment in each of steps 405 and 409 may comprise respectively increasing or reducing the handover parameters by 1 db each time. Thus, with the combination of incremental adjustments and the timer, any effects of the adjusted threshold parameters are realized prior to making additional adjustments.

Figure 5:
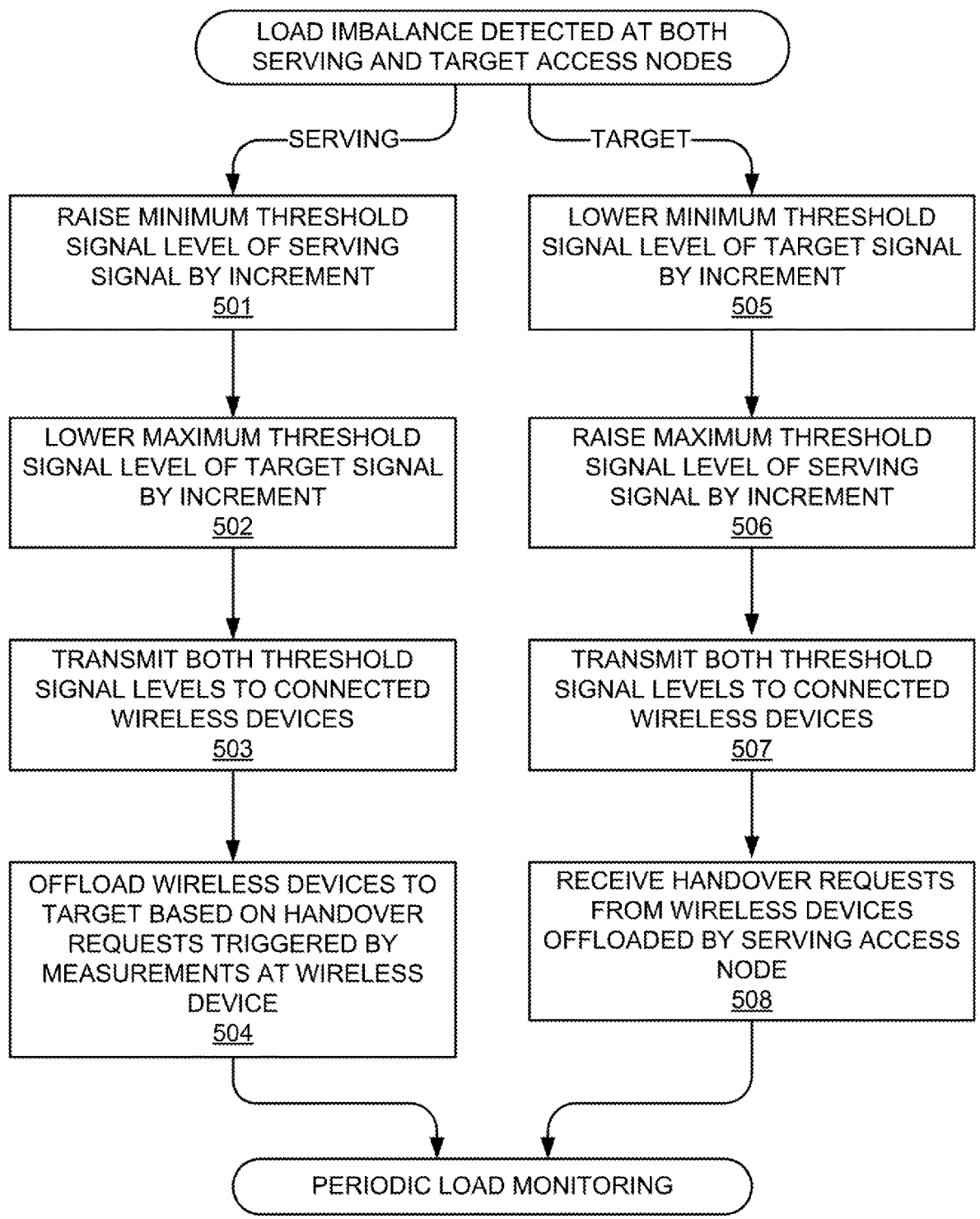
FIG. 5 depicts an exemplary method for adjusting handover thresholds.

FIG. 5 depicts an exemplary method for adjusting handover thresholds. The method of FIG. 5 is illustrated from the perspectives of one or more access nodes in a wireless network, or any suitable network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Generally, a load imbalance may be detected (or a load imbalance indicator received) at one or both of serving cell and a target cell. The terms "serving cell" and "target cell" in this embodiment are intended to suggest that a handover is eventually performed from the serving cell to the target cell due to congestion detected at the serving cell. The serving and target cell may both be co-located within and deployed by one access node, or alternatively may be co-located in the same service area but deployed by two neighboring access nodes. Each cell may be within a different band class. In either case, the operations at the congested serving cell generally include reducing an effective handover coverage area of the serving cell at 502 by raising the minimum threshold signal level associated with the serving band class by an increment. Alternatively or in addition, the operations can include increasing an effective handover coverage area of the target cell at 502 by lowering the maximum threshold signal level of the target signal. Thus, when a wireless device attached to the serving cell monitors measurements of signals from both cells, it is more likely to determine, due to the adjusted handover thresholds, that a signal level of the serving cell is below the increased threshold minimum and, therefore, requests a handover to the target cell, which is within the reduced threshold maximum signal level. At 504, this results in offloading wireless from the congested serving cell to the non-congested target cell based on the handover requests. Subsequently the load is periodically monitored.

Similarly, the operations at the target cell can discourage handovers of devices attached thereto by transmitting a separate set of thresholds, which lower a threshold minimum for coverage area 112 and raise a threshold maximum for coverage area 111, thereby reducing the likelihood of handover requests to band BAND1, despite measuring strong signal levels from band BAND1. For instance, upon the serving cell determining a load imbalance, information about the imbalance can be transmitted to the target cell via, for instance, an X2 connection, or other direct connection. Consequently, the operations triggered at the non-congested target cell generally include reducing a handover coverage area of the serving cell at 505 by lowering the minimum threshold signal level associated with the target signal by an increment, and increasing an effective handover coverage area of the target cell at 506 by raising the maximum threshold signal level of the serving signal by an increment. Thus, when a wireless device attached to the target cell (which is now serving the wireless device) monitors measurements of signals from both cells, it is less likely to request a handover to the previously-serving (congested) cell, by determining that a signal level of the target cell is above the decreased threshold minimum and that the signal level of the serving (congested) cell is below the increased threshold maximum signal level. Thus, at 508, the target cell continues to receive handover requests from the congested serving cell, while discouraging handovers from being triggered by wireless devices already-attached to the target cell.

Figure 6:
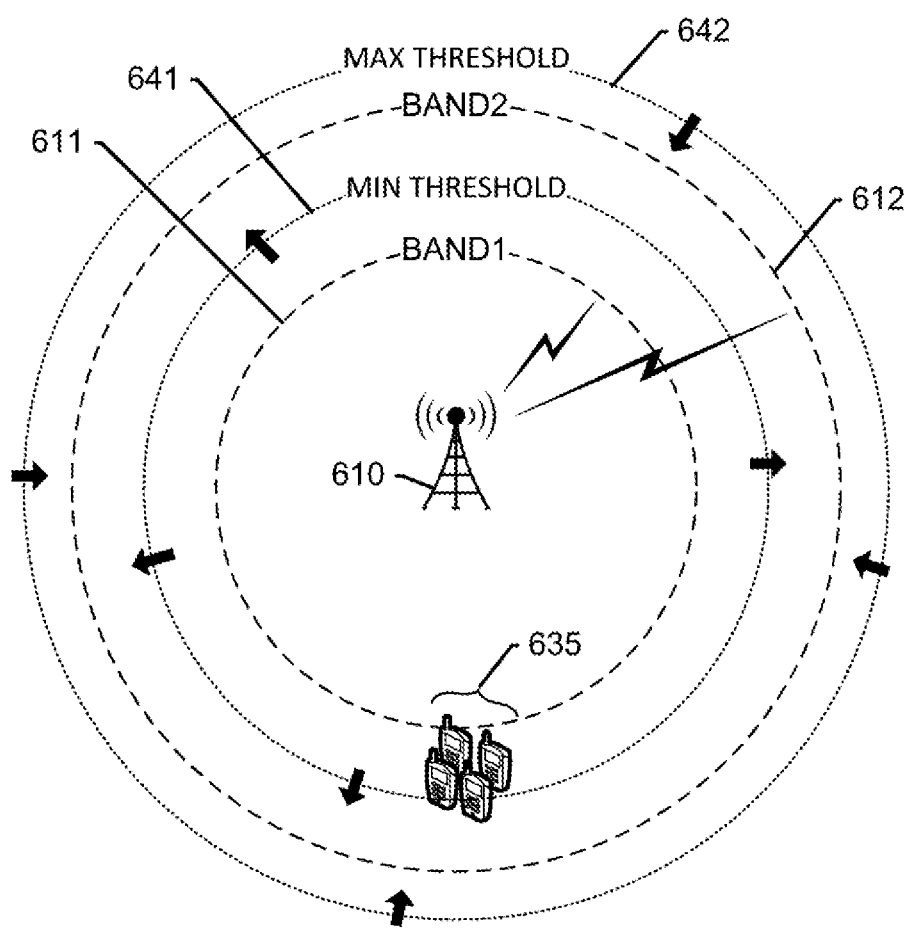
FIG. 6 depicts effects of an exemplary handover threshold adjustment for an access node deploying two frequency bands.

FIG. 6 depicts effects of an exemplary handover threshold adjustment for an access node 610 deploying two frequency bands. Similar to FIG. 1A, access node 610 may deploy a high frequency band class such as BAND1 having a coverage area 611, and a low frequency band class BAND2 having a coverage area 612. In some embodiments, band class BAND1 may be a TDD band class, and band class BAND2 may be an FDD band class. Other types and combinations of band classes are possible. In either case, upon access node 610 determining a load imbalance between the two frequency bands deployed therefrom, access node 610 can perform load balancing operations that encourage end-user wireless devices 635 to request a handover from congested frequency band BAND1 to non-congested frequency band BAND2. For instance, access node 610 increase a threshold minimum signal level 641 associated with band class BAND1, and to decrease a threshold maximum signal level 642 associated with band class BAND2. Thus, end-user wireless devices 635 are more likely to determine that a signal level of band class BAND1 falls below the raised threshold minimum signal level, and that a signal level of band class BAND2 rises above the lowered threshold maximum signal. Both determinations collectively can trigger a handover request. For instance, in an LTE system, such a pair of triggers is known as an A4 measurement. Consequently, wireless devices 635 request handovers to band class BAND2, thereby balancing the load.

Figure 7:
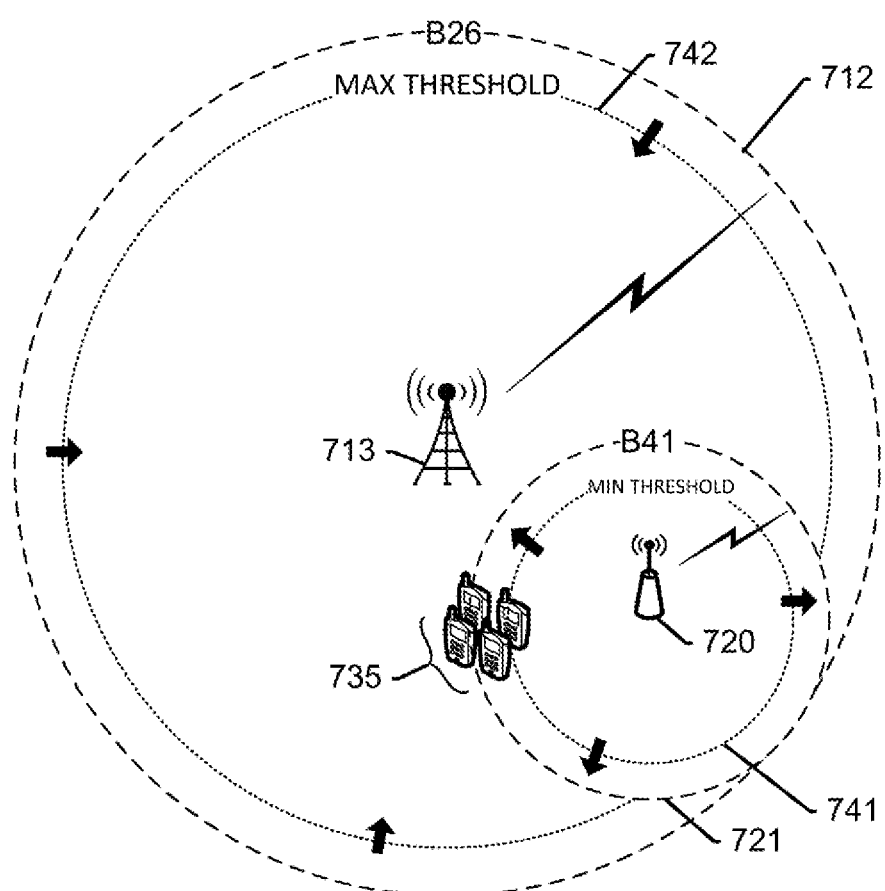
FIG. 7 depicts effects of an exemplary handover threshold adjustment for a small access node.

FIG. 7 depicts effects of an exemplary handover threshold adjustment for a small access node 720. Similar to FIG. 1B, access node 713 deploys a single low frequency band BAND2 having a coverage area 712, and small access node 120 deploys a single high frequency band BAND1, having a coverage area 721. Small access node 720 may determine congestion in band BAND1 caused by excess demand from end-user wireless devices 735, and may further determine, based on load measurements received from access node 713 via a direct connection, that a load difference exceeds a difference threshold. These determination trigger small access node 720 to perform load balancing operations that encourage end-user wireless devices 735 to request a handover from congested frequency band BAND1 to non-congested frequency band BAND2. A non-congested frequency band may be any frequency band that is less congested than a threshold, or less congested than an average congestion of other bands. For instance, small access node 710 increases a threshold minimum signal level 741 associated with band class BAND1, and decreases a threshold maximum signal level 742 associated with band class BAND2. Thus, end-user wireless devices 735 are more likely to determine that a signal level of band class BAND1 falls below the raised threshold minimum signal level, and that a signal level of band class BAND2 rises above the lowered threshold maximum signal. Both determinations collectively can trigger a handover request. For instance, in an LTE system, such a pair of triggers is known as an A4 measurement. Consequently, wireless devices 735 request handovers to band class BAND2, thereby balancing the load. Moreover, access node 713 can mirror these adjustments for wireless devices connected thereto, so as to avoid these wireless devices from requesting handovers to band class BAND1 deployed from small access node 720.

Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, a wireless device may be handed over from a first cell based on a triggered A5 event. Here, a received first signal level plus a hysteresis may be compared to a first threshold and a received second signal level plus offsets minus a hysteresis may be compared to a second threshold. The first received signal level may comprise a received signal level from the first cell and the second received signal level may comprise a received signal level from a target cell (e.g., the second cell), where the first and seconds signals are received at the wireless device. Some example signal levels may comprise a Received Signal Strength Indicator, (RSSI), Reference Signal Received Quality (RSRQ), RSRP, or any other suitable signal level.

In exemplary embodiments, an A5 measurement event trigger can be expressed as $First\_Signal_{received} + First\_Hys_{A5} < First\_Thresh_{A5}$ AND $Second\_Signal_{received} + Offsets_{A5} - Second\_Hys_{A5} > Second\_Thresh_{A5}$, where $First\_Signal_{received}$=Received First Signal Level, $First\_Hys_{A5}$=First_Hysteresis for an A5 event, $First\_Thresh_{A5}$=First_Threshold for an A5 event, $Second\_Signal_{received}$=Received Second Signal Level, $Second\_Hys_{A5}$=Second Hysteresis for an A5 event, $Offsets_{A5}$=Offsets for an A5 event, and $Second\_Thresh_{A5}$=Second Threshold for an A5 event. The handover event may be triggered when the received first signal level plus the first hysteresis is less than the first threshold and the received second signal level plus the offsets minus the second hysteresis is greater than a second threshold.

Figure 8A:
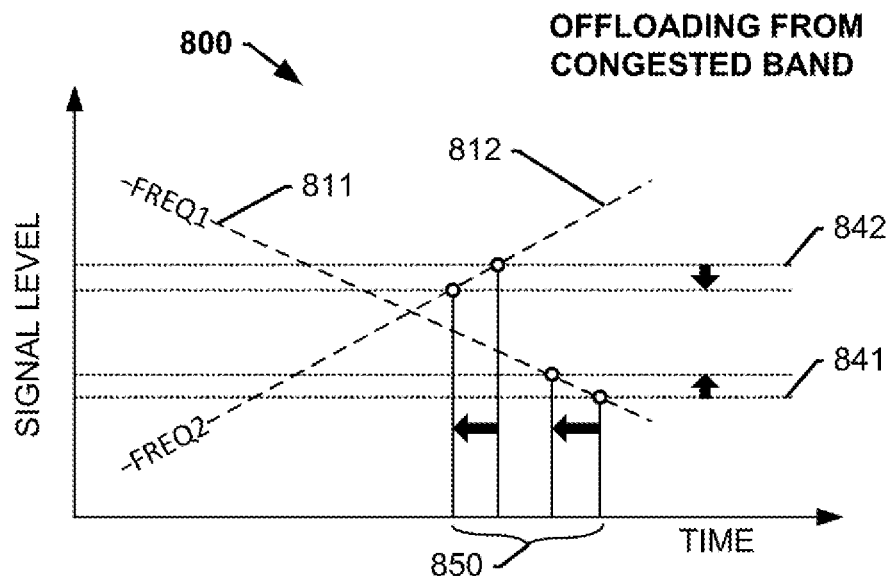
FIGS. 8A and 8B depict exemplary handover threshold adjustments for load balancing.
Figure 8B:
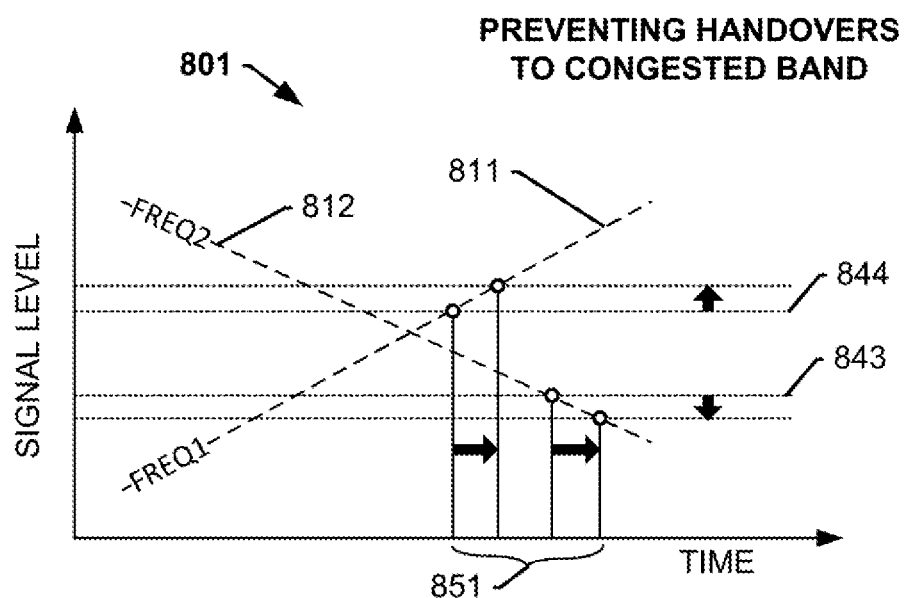

FIGS. 8A and 8B depict exemplary handover threshold adjustments for load balancing. FIG. 8A shows a graph 800 representing threshold adjustments that trigger increased wireless devices to be offloaded from a congested band. The graph shows a signal level 811 of a congested cell Freq1 deteriorating or lowering over time, while a signal level 812 or of a non-congested cell Freq2 increases over time. At some point in time, signal level 811 drops below minimum threshold 841, and signal level 812 rises above maximum threshold 842. Typically, a wireless device attached to the congested serving cell monitors signal levels 811, 812 and, upon determining that both thresholds are crossed, requests a handover. According to the operations described herein, this handover request is encouraged by raising minimum threshold signal level 841 and lowering maximum threshold signal level 842. This effectively shortens the amount of time (see 850) that a wireless device will eventually request a handover to the cell with the higher signal level. In other words, more frequent handover requests from Freq1 to Freq2 eventually balance the load between the two cells.

Correspondingly, FIG. 8B shows a graph 801 representing threshold adjustments aimed at preventing handovers of wireless devices to a congested band. In contrast to graph 800 in FIG. 8A, graph 801 shows a signal level 812 of a non-congested cell (i.e. Freq2) deteriorating or lowering over time, while a signal level 811 of the congested cell (Freq1) increases over time. At some point in time, signal level 812 drops below minimum threshold 843, and signal level 812 rises above maximum threshold 842, thus triggering a handover request from a wireless device attached to the non-congested cell. However, according to the operations described herein, this handover request is discouraged, particularly in the case that non-congested cells may determine the imbalance using information shared by a congested cell. Thus, the non-congested cell discourages handovers for wireless devices attached thereto, by lowering minimum threshold signal level 843 and raising maximum threshold signal level 844. This effectively delays (see 851) a wireless device from requesting a handover to the congested cell, despite measuring a higher signal level 811. In other words, less frequent handover requests from Freq2 to Freq1 avoid already-congested cell Freq1 from being more congested.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 140 may be, comprise, or include computers systems and/or processing nodes. This includes, but is not limited to: access nodes 110, 113, small access node 120, and/or network 101.

Figure 9:
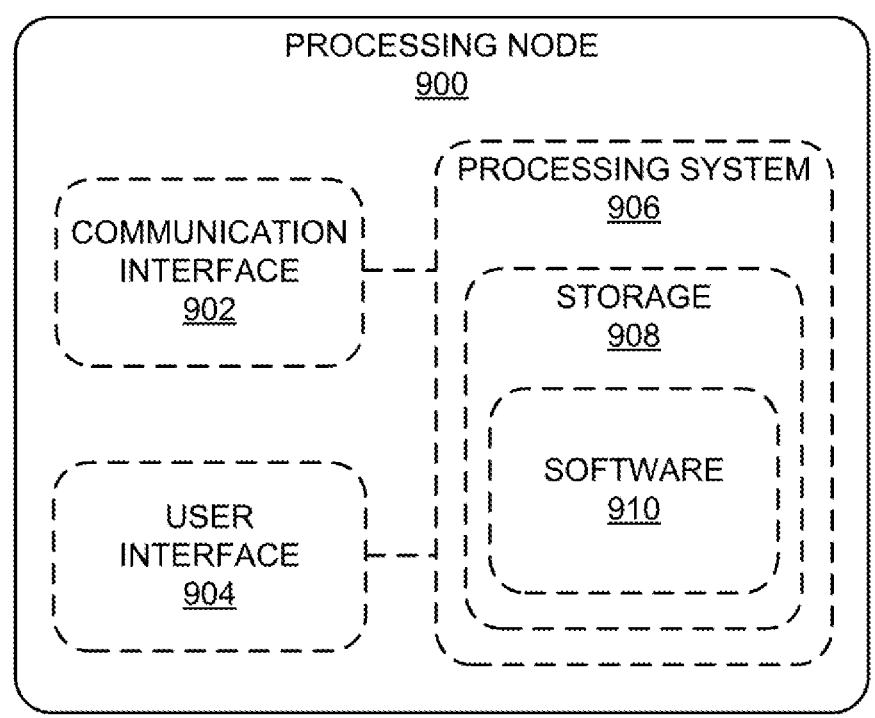
FIG. 9 depicts an exemplary processing node for performing load balancing operations.

FIG. 9 depicts an exemplary processing node 900 comprising a communication interface 902, user interface 904, and processing system 906 in communication with communication interface 902 and user interface 904. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. For example, storage 908 may include a buffer. Software 910 may include computer programs, firmware, or some other form of machine-readable instructions, including an operating system, utilities, drivers, network interfaces, applications, or some other type of software. For example, software 910 may include a buffer allocation module. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for load balancing, the method comprising:
obtaining a first cell load of a first frequency band and a second cell load of a second frequency band;
   determining a load imbalance between the first cell load and the second cell load based on one or both of: the first cell load exceeding a threshold load, or a difference between the first cell load and the second cell load exceeding a difference threshold;
   responsive to determining the load imbalance, incrementally adjusting a handover threshold parameter by a defined value per each loop of a periodic timer; and
   incrementally returning the adjusted handover threshold parameter to a default value by the defined value per each loop of the periodic timer responsive to determining that the load imbalance is minimized,
   wherein the incremental adjustment of the handover threshold parameter correspondingly adjusts an effective cell radius of one or both of the first frequency band or the second frequency band.

2. The method of claim 1, wherein the handover threshold parameter comprises a signal strength of the first frequency band.

3. The method of claim 2, further comprising transmitting the adjusted handover threshold parameter to a wireless device using the first frequency band.

4. The method of claim 3, wherein the adjusted handover threshold parameter causes the wireless device to request a handover to the second frequency band.

5. The method of claim 2, further comprising:
   determining the difference between the first cell load and the second cell load responsive to determining that the first cell load exceeds the threshold load.

6. The method of claim 2, further comprising: adjusting the handover threshold parameter responsive to determining that the difference between the first cell load and the second cell load exceeds the difference threshold.

7. The method of claim 2, wherein adjusting the handover threshold parameter further comprises:
   increasing a first threshold signal level for the first frequency band; and
   decreasing a second threshold signal level for the second frequency band.

8. The method of claim 7, wherein:
   the first frequency band is deployed by a first access node,
   the second frequency band is deployed by a second access node, and
   the method further comprises receiving, upon expiration of the periodic timer, the second cell load via a direct connection from the second access node.

9. The method of claim 8, further comprising transmitting, upon expiration of the periodic timer, the first cell load to the second access node via the direct connection.

10. The method of claim 9, further comprising measuring a third cell load of the first access node, and determining that the third cell load does not exceed the threshold load.

11. The method of claim 2, further comprising resetting the periodic timer subsequent to adjusting the handover threshold parameter.

* * * * *